Sept. 16, 1930.  J. VERNER  1,776,206

FOAM COLUMN

Filed Aug. 31, 1927

Inventor
JULES VERNER
By his Attorney

Patented Sept. 16, 1930

1,776,206

UNITED STATES PATENT OFFICE

JULES VERNER, OF LINDEN, NEW JERSEY, ASSIGNOR TO STANDARD OIL DEVELOPMENT COMPANY, A CORPORATION OF DELAWARE

FOAM COLUMN

Application filed August 31, 1927. Serial No. 216,574.

This invention relates to an improvement in columns for the delivery of a fire extinguishing foam onto the surface of a combustible liquid, and has for its object a form of apparatus whereby fires occurring at the surface of such a liquid may be more speedily and effectually extinguished.

Fires in tanks containing combustible liquids such as petroleum oils may be extinguished by flowing a blanket of fire extinguishing foam onto the surface of the liquid. The foam may be delivered by a pipe, open at the upper end, projecting above the surface of the liquid. This pipe will be hereinafter referred to as a foam column.

The foam may be generated in any way. It may be piped to the column from a remote point, but is ordinarily produced by mixing foam producing solutions when required in the base of the column, or in a receptacle, or mixing chamber in communication therewith.

My invention comprehends an improved type of foam column made of material stable at ordinary temperatures, but fusible by the heat produced by combustion at the surface of the liquid. In the event of a fire that part of the column projecting above the surface is automatically fused and removed and the foam is delivered substantially directly onto the surface. My column may be made of substantially any fusible material although I preferably employ a metal having a melting point between 100 and 900° C. A column of zinc is well adapted to my purpose. My column may, moreover, if desired be completely sealed at the upper end to prevent ingress of liquid or vapor when not in use.

Figure 1:
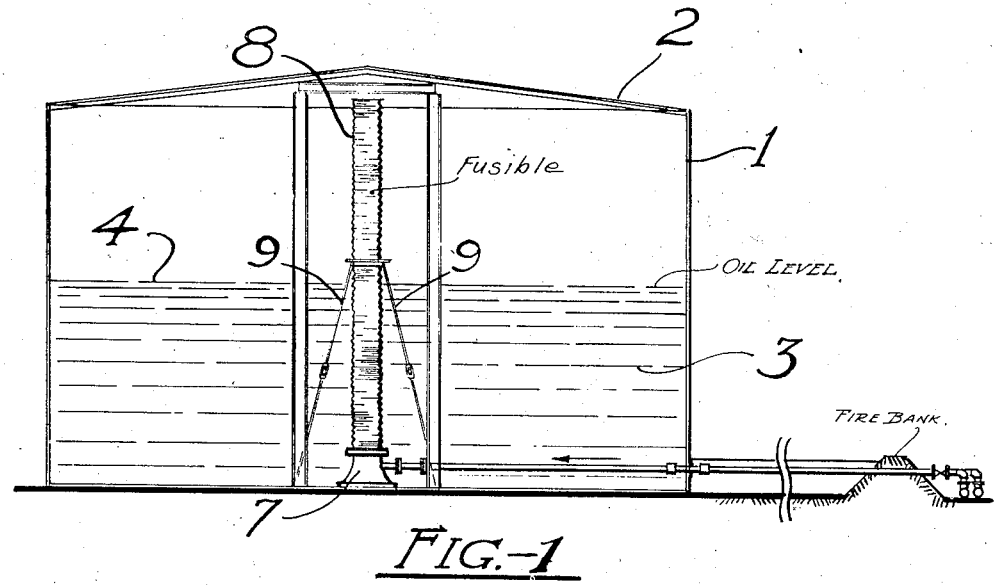
Figure 2:
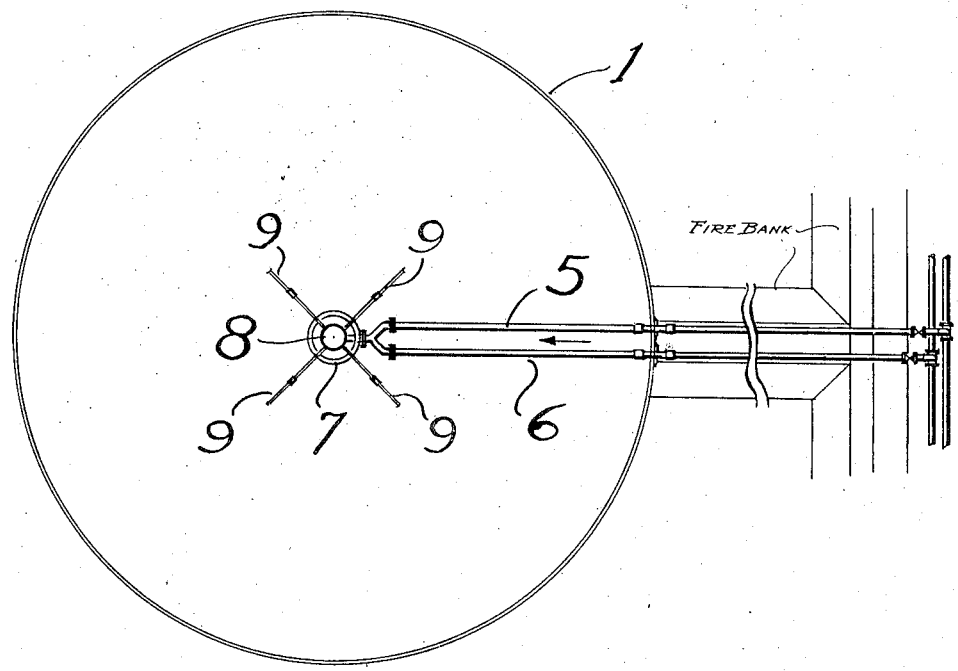

Fig. 1 is a diagrammatic vertical cross section of a preferred embodiment of my invention, and Fig. 2 is a diagrammatic horizontal cross section of the same.

Reference numeral 1 denotes a tank for the storage of combustible liquids such as petroleum oils. This is provided with roof 2, and contains a combustible liquid such as petroleum oil 3, up to the level 4. Foam producing solutions may be introduced through pipes 5 and 6 discharging into receptacle 7. This is preferably of such dimensions that any fused material from the column falling therein will not impede the flow of foam. Receptacle 7 is surmounted by foam column 8, which is secured by braces 9. The column is preferably made of a metal fusible between 100 and 900° C. relatively thin, say 8 gauge or less, and transversely corrugated.

The operation of this column is identical with that of columns now in use, except that in the event of a fire this column automatically shortens to a few inches above the surface of the oil and the foam is delivered substantially directly onto the surface.

The apparatus shown is an illustration and not in limitation, and various alternatives may be adopted within the scope of the appended claims, in which it is my intention to claim broadly all novelty inherent in the invention.

I claim:

1. In combination with a tank for storage of inflammable liquid, a foam column arranged in the tank and normally in part submerged in the liquid and in part projecting above the surface of the liquid, said column being constructed of a material adapted to fuse at the temperature attained by its exposed portion in case the liquid burns, and means free from connection with the upper structure of the tank and connected with the lower part of the column for supplying foam thereto.

2. Apparatus according to claim 1, in which the column is made of material fusible between 100 and 900° C.

3. Apparatus according to claim 1, in which the column is made of thin material fusible between 100 and 900° C., and transversely corrugated.

4. Apparatus according to claim 1, in which the column is in a substantially vertical position and spaced from the walls of the tank.

5. Apparatus according to claim 1, in which the tank is in the form of a vertical cylinder and the foam column is vertically placed substantially in its axis.

6. Apparatus according to claim 1, in which the means for feeding the column comprises a pair of pipes projecting through the lower part of the tank wall and communicating with the lower end of the foam column, said pipes being connected to suitable sources of foam producing ingredients.

7. Apparatus for extinguishing fires in inflammable liquid tanks, which comprises a foam column normally in part submerged in the liquid and in part unsubmerged, said column being composed throughout its effective length substantially solely of a readily fusible metallic substance, and means for supplying foam to the lower part of the column when the unsubmerged portion thereof is fused by heat of burning liquid in the tank, whereby the entire stream of foam is discharged directly upon the liquid surface.

8. Apparatus according to claim 7, in which a pipe discharging into the column near the bottom of the same supplies the foam or foam producing materials.

JULES VERNER.